United States Patent

Esaki et al.

[11] Patent Number: 5,883,496
[45] Date of Patent: Mar. 16, 1999

[54] ELECTRIC VEHICLE POWER SUPPLY

[75] Inventors: Kenji Esaki, Aichi-ken; Ko Nozaki, Chiryu, both of Japan

[73] Assignee: Toyota Jidosha Kabushiki Kaisha, Toyota, Japan

[21] Appl. No.: 845,345

[22] Filed: Apr. 21, 1997

[30] Foreign Application Priority Data

May 8, 1996 [JP] Japan .................................. 8-113889

[51] Int. Cl.$^6$ ........................................................ H02J 7/00
[52] U.S. Cl. ........................... 320/132; 320/104; 318/139
[58] Field of Search ..................... 320/103, 104, 320/125, 126, 128, 132, DIG. 34, 134, 136, 166, 167; 318/139

[56] References Cited

U.S. PATENT DOCUMENTS

| | | | |
|---|---|---|---|
| 4,090,122 | 5/1978 | Hoinski | 320/125 |
| 4,351,405 | 9/1982 | Fields et al. . | |
| 5,119,010 | 6/1992 | Shirata et al. | 320/166 |
| 5,412,251 | 5/1995 | Furutani et al. . | |
| 5,418,401 | 5/1995 | Kaneyuki | 320/125 |
| 5,602,459 | 2/1997 | Rogers | 320/134 |
| 5,717,310 | 2/1998 | Sakai et al. | 320/104 |
| 5,789,640 | 7/1998 | Sakai et al. | 320/104 |
| 5,796,224 | 8/1998 | Hayashi et al. | 320/104 |

FOREIGN PATENT DOCUMENTS

| | | |
|---|---|---|
| 0 424 577 | 5/1991 | European Pat. Off. . |
| 4-271209 | 9/1992 | Japan . |
| 5-30608 | 2/1993 | Japan . |

OTHER PUBLICATIONS

A. F. Burke, Proceedings of the 25$^{th}$ Intersociety Energy Conversion Engineering Conference, vol. 6, pp. 119–135, Aug. 12, 1990, "Electric Vehicle Propulsion and Battery Technology 1975–1995".

Primary Examiner—Peter S. Wong
Assistant Examiner—K. Shin
Attorney, Agent, or Firm—Oblon, Spivak, McClelland, Maier & Neustadt, P.C.

[57] ABSTRACT

To obtain an electric vehicle power supply 10 having a high output power density and regenerative power density, and which is compact and lightweight wherein a first battery 12 whose regenerative power density increases with decrease of the SOC and a second battery 14 whose output power density increases with increase of the SOC are used as an electrical storage device, and control is performed so that the SOC of the first battery 12 is maintained low while the SOC of the second battery 14 is maintained high. The regenerative power density of the first battery 12 is therefore high, the regeneration current from the motor 32 is mainly stored by the first battery 12, and the force used to drive the motor 32 is mainly output by the second battery 14 which has a high output power density.

8 Claims, 8 Drawing Sheets

ELECTRIC VEHICLE POWER SUPPLY

BACKGROUND OF THE INVENTION

1. Field of the Invention

This invention relates to a power supply for an electric vehicle, and in particular to a power supply which can be made compact and lightweight.

2. Description of the Related Art

Various types of electric vehicle are known which run using power stored in an electrical storage device to drive a motor.

Examples of such vehicles are an internal combustion engine-electrical storage device hybrid electric vehicle wherein a motor linked to the main shaft of the engine and an electrical storage device are connected via an inverter circuit and power is transmitted between them, a generator battery-electrical storage device hybrid electric vehicle wherein power is transmitted between a fuel battery or solar cell and an electrical storage device via a converter circuit, and an electric vehicle which is driven only by an electrical storage device. These electric vehicles are provided with a so-called regeneration circuit which converts the energy of braking into electrical energy and charges the storage device.

Typical storage devices used in these conventional electric vehicles are batteries such as lead accumulators or nickel hydrogen cells and high capacity condensers such as double layer capacitors.

This storage device must be able to provide sufficient energy to improve power characteristics and steering to match the acceleration performance of the vehicle, and improve acceleration holding distance. It must also have high power charging characteristics in braking regeneration.

However in the above conventional electric vehicle, only one electrical storage device is used, so if it was attempted to satisfy all the above criteria, the storage device became bigger and heavier, and it was very difficult to mount it on the vehicle. On the other hand, when the storage device was made small so as to be able to mount it on the vehicle, it charged and discharged too rapidly or overcharged and overdischarged when it output power or was charged with regenerative power, and this led to a shortening of the lifetime of the device.

In particular, in the case of a hybrid electric vehicle where an internal combustion engine or generator type battery are mounted together with the electrical storage device, there are more limitations on space and weight, and hence there is an even greater need for compactness and lightweightness.

As a solution, Japanese Patent Laid-Open Publication No. Hei 5-30608 discloses a high capacity condenser used in conjunction with the electrical storage device. In this conventional example, charging and discharging during large accelerations and decelerations of the vehicle are mainly handled by the high capacity condenser.

However, the energy density of existing high capacity condensers is only $\frac{1}{4}$–$\frac{1}{35}$ of that of a conventional storage battery, so the energy density of the whole system decreased as a result. The condenser has a high output power per unit weight, i.e., output power density (W/kg), and a high regenerative power charging capacity, i.e., regenerative power density (W/kg). However the specific gravity is only approx. $\frac{3}{5}$ of a conventional storage battery, so the output power density (W/L) and regenerative power density (W/L) per unit volume were small, and the condenser became bulky.

SUMMARY OF THE INVENTION

This invention, which was conceived in view of the above problems, therefore aims to provide an electric vehicle power supply having high output power density and regenerative power density, and which can be made compact and lightweight.

To achieve the above objects, according to a first aspect of the invention, there is provided an electric vehicle power supply wherein a motor is driven by power stored in an electrical storage device, and the electrical storage device is charged by regenerative power from the motor, this power supply comprising a first battery in the storage device, of which the regenerative power density increases as the SOC (State of Charge) decreases, a second battery in the storage device, of which the output power density increases as the SOC increases, and SOC control means which maintains the SOC of the first battery equal to or lower than a first predetermined value and maintains the SOC of the second battery equal to or higher than a second predetermined value.

According to a second aspect of the invention, in the electric vehicle power supply according to the first aspect, the first and second batteries are lithium ion batteries or lithium polymer batteries.

According to the aforementioned construction, charging by regenerative power is performed mainly by the first battery, and the power to drive the motor is provided mainly by the second battery. The batteries can therefore be used when both the regenerative power density and output power density are high.

According to a third aspect of the invention, the electric vehicle power supply according to the first aspect further comprises a selector switch connected to a power circuit of the motor, this selector switch being switched to the first battery when the device is charging with regenerative power and switched to the second battery when the motor is driven.

According to this construction, the first battery which has a high regenerative power density is charged with regenerative power, and the second battery which has a high output power density is used to drive the motor. In this way, the performance characteristics of both batteries are more fully exploited.

According to a fourth aspect of the invention, the electric vehicle power supply according to the first aspect further comprises a break switch connected to the second battery, this break switch being closed only when drive force is supplied to the motor.

According to this construction, the second battery is connected to the motor only when power is supplied to the motor and it is disconnected from the motor during regeneration. Overcharging due to regenerative power flowing into the second battery is therefore prevented.

According to a fifth aspect of the invention, the electric vehicle power supply according to the first aspect further comprises a circuit to charge the second battery from the first battery.

According to a sixth aspect of the invention, the electric vehicle power supply according to the first aspect further comprises a bypass circuit for bypassing the first and second batteries so as to lead regenerative power to earth.

According to a seventh aspect of the invention, the electric vehicle power supply according to the first aspect further comprises an alternator for supplying charging current to the first and second batteries when regenerative power is insufficient.

By means of the aforementioned construction, the SOC control means controls the SOC of the first and second batteries.

According to an eighth aspect of the invention, there is provided an electric vehicle power supply which provides power to drive a motor and which is charged by regenerative power from the motor, this power supply comprising first means of which the regenerative power density increases as the SOC (State of Charge) decreases, for being charged by regenerative power, second means of which the output power density increases as the SOC increases, for supplying power to drive the motor, and third means for maintaining the SOC of the first means equal to or lower than a first predetermined value and maintaining the SOC of the second means equal to or higher than a second predetermined value.

DESCRIPTION OF THE PREFERRED EMBODIMENTS

One embodiment of this invention will now be described with reference to the drawings.

Figure 1:
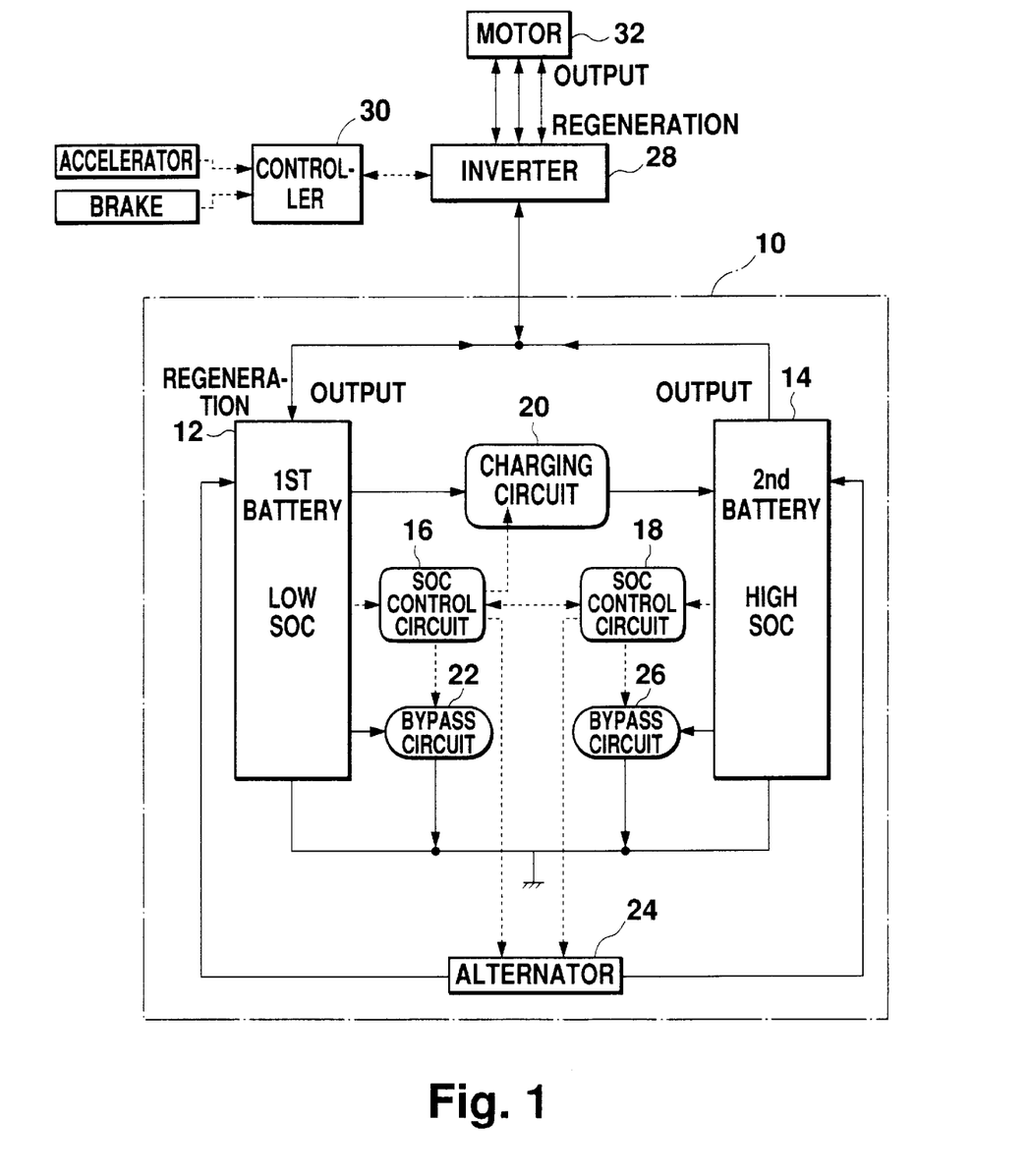
FIG. 1 is a block diagram showing one form of the electric power supply according to this invention.

FIG. 1 shows a block diagram of one form of the electric vehicle power supply according to this invention. In FIG. 1, a power supply 10 comprises a first battery 12 maintained at a low state of charge (SOC) and a second battery 14 maintained at a high SOC. A SOC control circuit 16 controls the SOC of the first battery, and a SOC control circuit 18 controls the SOC of the second battery.

According to this embodiment, the electrical storage device of this invention comprises the first battery 12 and second battery 14.

In the power supply 10, the first battery 12 is a battery of which the regenerative power charging capacity per unit weight (kg) or unit volume (L), i.e., the regenerative power density, increases with decrease of SOC, and the second battery 14 is a battery of which the power output capacity per unit weight or unit volume, i.e., the output power density, increases with increase of SOC. Hence, when drive power is supplied to a motor 32 via an inverter 28, the power is supplied mainly from the second battery 14. Also it is mainly the first battery 12 which is charged by regenerative power from the motor 32 via the inverter 28. Due to this construction, power regeneration and power output are performed by batteries having respectively superior performances for each of these functions, and the output power density and regenerative power density of the overall device are therefore improved. It will be noted that the inverter 28 is the power circuit of this invention.

The SOC control circuit 16 monitors the SOC of the first battery 12. It charges the second battery 14 from the first battery 12 via a charging circuit 20, and earths regenerating current via a bypass circuit 22 so that it does not charge the first battery 12. In this way, the SOC of the first battery 12 is maintained equal to or lower than a predetermined value. This predetermined value corresponds to the first value according to this invention. The charging circuit 20 may be a DC/DC converter, a regulator or the like.

It is also preferable that, when the SOC of the first battery 12 is lower than a predetermined lower limit, the SOC control circuit 16 charges from an alternator 24 so that the SOC of the first battery 12 is maintained equal to or higher than the lower limit.

The SOC control circuit 18 monitors the SOC of the second battery 14. When this SOC falls below a predetermined value, it receives charge from the first battery 12, and charges from the alternator 24 so that the SOC of the second battery 14 is maintained equal to or higher than a predetermined value. This predetermined value corresponds to the second value according to this invention.

It is also preferable that when the SOC of the second battery 14 is equal to or higher than a predetermined upper limit, the SOC control circuit 18 earths regenerative power from the bypass circuit 2 so as to prevent overcharging of the second battery 14.

Herein, the SOC control means according to this invention comprises the aforesaid SOC control means 16, 18.

The first battery 12 and second battery 14 are connected to the inverter 28, three-phase power being supplied to the motor 32 from the inverter 28 according to commands from a controller 30. The controller 30 controls the inverter 28 based on signals input to the controller from an accelerator, brake, etc. In this process, as described above, the power used to drive the motor 32 is supplied mainly from the second battery 14.

When the vehicle is braking, the motor 32 functions as an inductive generator, and generated power is regenerated in the first battery 12 and second battery 14 via the inverter 28. In this process, as described above, the regenerative power is used mainly to charge the first battery 12.

Figure 2:
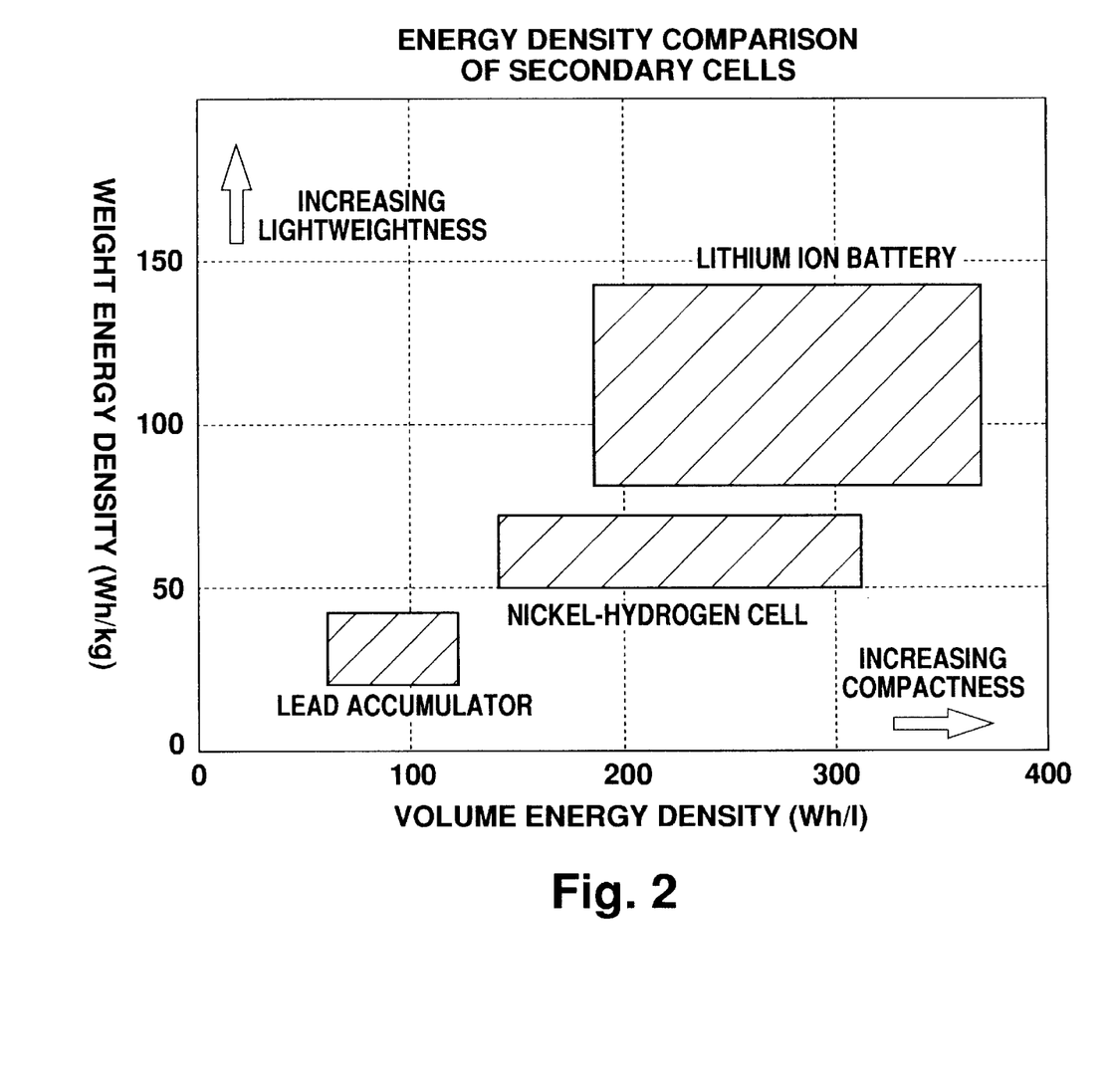
FIG. 2 is a diagram showing a comparison of energy densities of secondary cells.

The batteries used as the electrical storage device of the electric vehicle may be lead accumulators, nickel-hydrogen cells or lithium ion batteries. The energy distribution of these batteries is shown in FIG. 2. As can be seen from FIG. 2, the lithium ion battery has the highest energy density, and it offers the greatest advantage in terms of compactness and lightweightness. It is therefore preferable that the first battery 12 and second battery 14 are lithium ion batteries.

Figure 3:
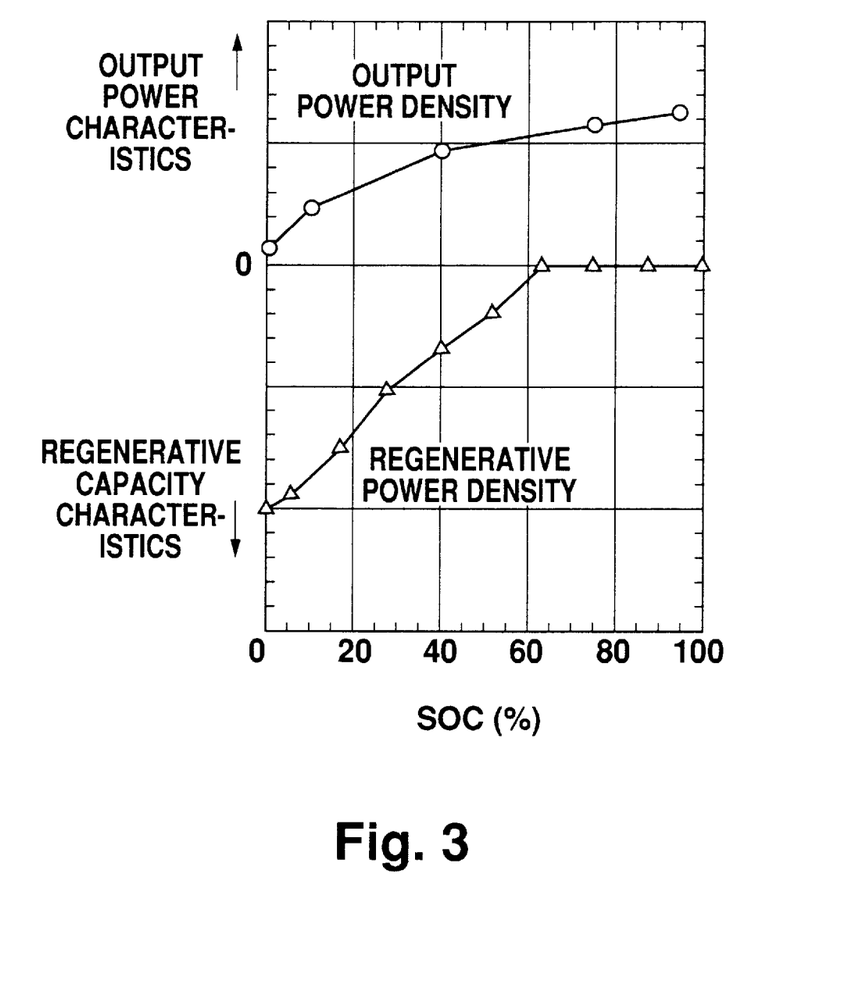
FIG. 3 is a diagram showing a relationship between SOC, output power density and regenerative power density.
Figure 4:
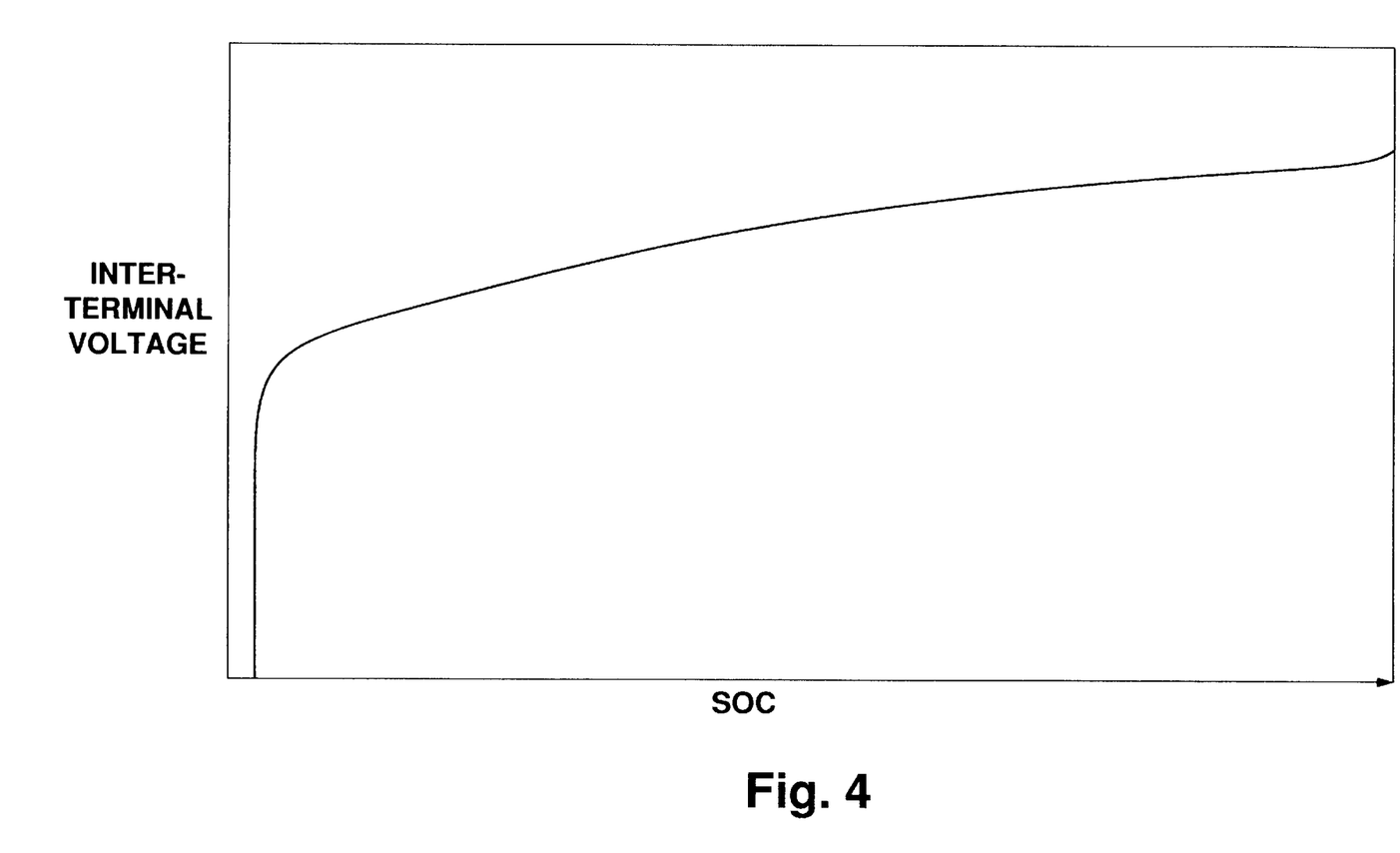
FIG. 4 is a diagram showing a relationship between SOC and inter-terminal voltage.

FIG. 3 shows the output power characteristics and regenerative capacity characteristics relative to the SOC of the lithium ion battery. In FIG. 3, the horizontal axis is SOC with SOC increasing towards the right of the diagram. The vertical axis shows output power characteristics and regenerative capacity characteristics. The output power characteristics are expressed as output power density of which the value is seen to increase with increasing distance above 0 on the horizontal axis. The regenerative capacity characteristics are expressed as regenerative power density of which the value is seen to increase with increasing distance below 0 on the horizontal axis.

As shown in FIG. 3, in a lithium ion battery, the output power density and regenerative power density vary largely depending on the value of the SOC. As the SOC falls, the regenerative power density increases and output power density decreases. On the other hand, when the SOC increases, the regenerative power density largely decreases and the output power density increases.

From the aforesaid characteristics, the battery which is charged by regenerative power from the motor maintains a low SOC, while the battery which supplies power to the motor 32 maintains a high SOC, so the characteristics of each battery are fully exploited. As a result, output power density and regenerative power density are improved compared to the case where a single battery is used to store regenerative power and output drive power, and the power supply 10 can therefore be made compact and lightweight. It may be noted that instead of a lithium ion battery, a lithium polymer battery may be used, as it has similar characteristics.

In the power supply 10 shown in FIG. 1, lithium ion batteries are used for the first battery 12 and second battery 14 as described above. One way of controlling the SOC of these batteries by the SOC control circuits 16, 18, is to detect the SOC by integrating the charging/discharging current. Also, when the lithium ion battery uses carbon having a low crystallinity instead of graphite as the active substance of the negative electrode, the inter-terminal voltage increases in effectively linear proportion to the SOC, hence in a lithium battery of this type the SOC can be controlled by the inter-terminal voltage.

Figure 5:
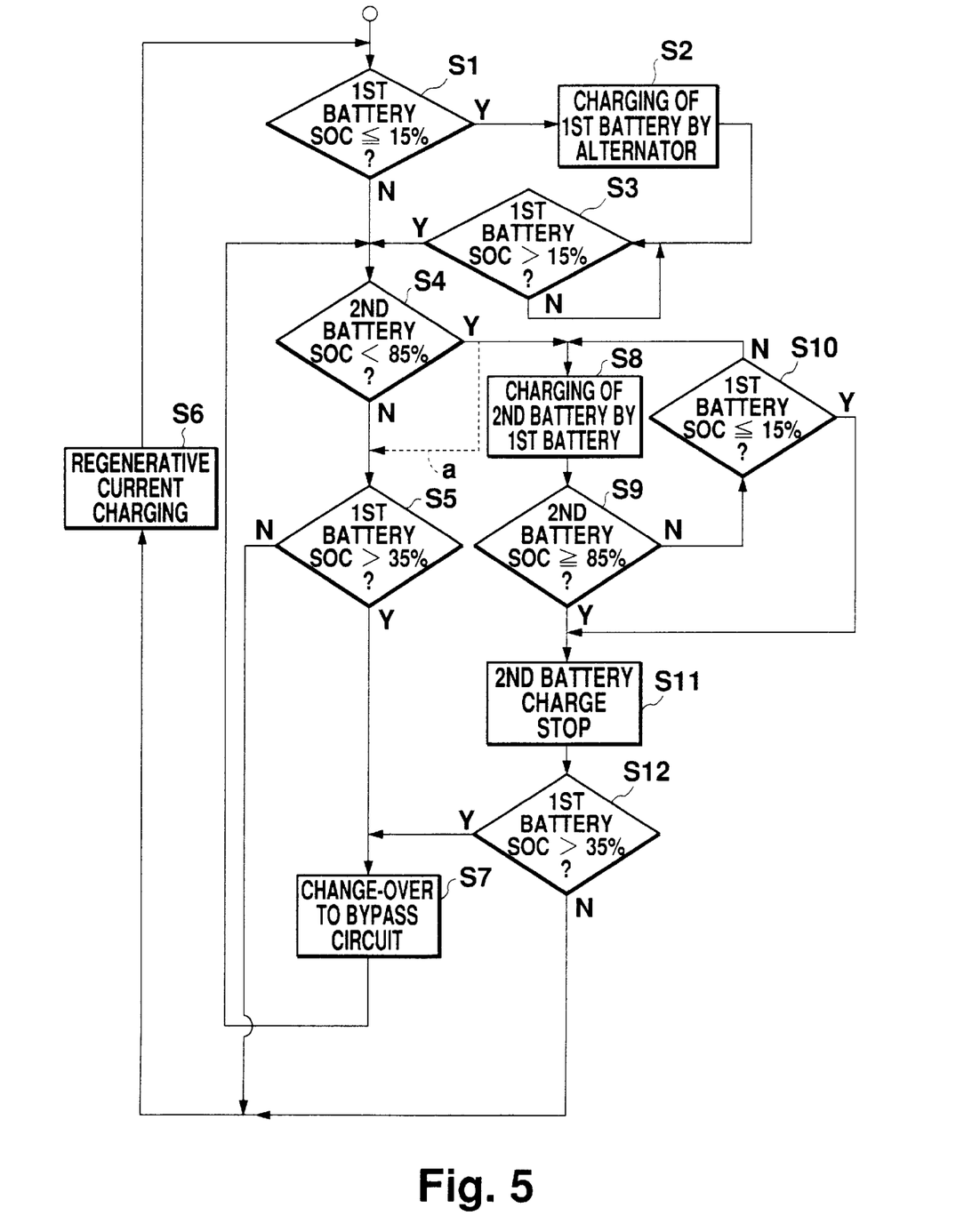
FIG. 5 is a diagram showing a process flow for controlling the SOC of the first battery in FIG. 1.

FIG. 5 is an SOC control flowchart for the first battery 12 in the power supply 10 shown in FIG. 1. In this embodiment, an example is shown where the SOC control range of the first battery 12 is 25±10%. In this case, the aforementioned first value is 35% of the SOC of the first battery 12.

In FIG. 5, when the SOC control circuit 16 starts operating, it is determined whether or not the SOC of the first battery 12 is 15% or less (S1). When the SOC of the first battery 12 is 15% or less, a command is issued by the SOC control circuit 16 to charge from the alternator 24 until the SOC of the first battery 12 exceeds 15% (S2, S3).

When the SOC of the first battery 12 exceeds 15%, it is determined whether or not the SOC of the second battery 14 is less than 85% (S4).

When the SOC of the second battery 14 is equal to or greater than 85%, charging of the second battery 14 from the first battery 12 is not performed, and it is next determined whether or not the SOC of the first battery 12 exceeds 35% (S5). When the SOC of the first battery 12 does not exceed 35%, the regenerative power density of the first battery 12 is sufficiently high, so the SOC control circuit 16 does not activate the bypass circuit 22 and regenerative power from the motor 32 is received by the batteries (S6). At this time, it is mainly the first battery 12 which receives the regenerative power, as stated above.

On the other hand, when the SOC of the first battery 12 is higher than 35% in S5, the SOC would increase and regenerative power density would decrease if more regenerative power were received. The SOC control circuit 16 therefore activates the bypass circuit 22, and all the regenerative power is earthed via the bypass circuit 22 (S7). Subsequently, charging of the first battery 12 with regenerative power is stopped until the SOC of the first battery 12 falls to 35% or less.

In the above state, when the SOC of the second battery 14 has fallen to less than 85% in S4, the second battery 14 is charged from the first battery 12 via the charging circuit 20 (S8). This charging is continued until the SOC of the second battery 14 is 85% or higher (S9), or the SOC of the first battery 12 is 15% or less (S10).

When the second battery 14 is charged from the first battery 12 in S8 to S10, and the bypass circuit 22 does not function, regenerative power from the motor 32 is stored in the first battery 12. When this regenerative power is large and the amount charged in the second battery 14 is small, the SOC of the first battery 12 increases still further. It is therefore preferable that when the second battery 14 is charged from the first battery 12, the SOC of the first battery 12 is monitored to check whether or not it increases higher than 35% in S5, as shown by the path of the dotted line a in FIG. 5.

When the SOC of the second battery 14 is 85% or more, or the SOC of the first battery 12 is 15% or less, charging of the second battery 14 is stopped (S11).

Next, it is determined whether or not the SOC of the first battery 12 is higher than 35% (S12). When it is higher than 35%, regenerative power from the motor 32 is earthed via the bypass circuit 22 (S7). On the other hand when the SOC of the first battery 12 is 35% or less, the bypass circuit 22 is not activated, and regenerative power from the motor 32 is stored by the batteries (S6). As described hereinabove, the regenerative power is stored mainly by the first battery 12.

Due to the above steps, by means of the SOC control circuit 16, the second battery 14 is charged by the first battery 12, and regenerative power from the motor 32 is received by the first battery 12 and discharged from the bypass circuit 22 to earth. In this way, the SOC of the first battery 12 is controlled within a range of 25±10%. It may be noted that the control range of the SOC of the first battery 12 is not limited to the above range, and it need only be set so as to maintain sufficient regenerative power density based on the battery characteristics.

Figure 6:
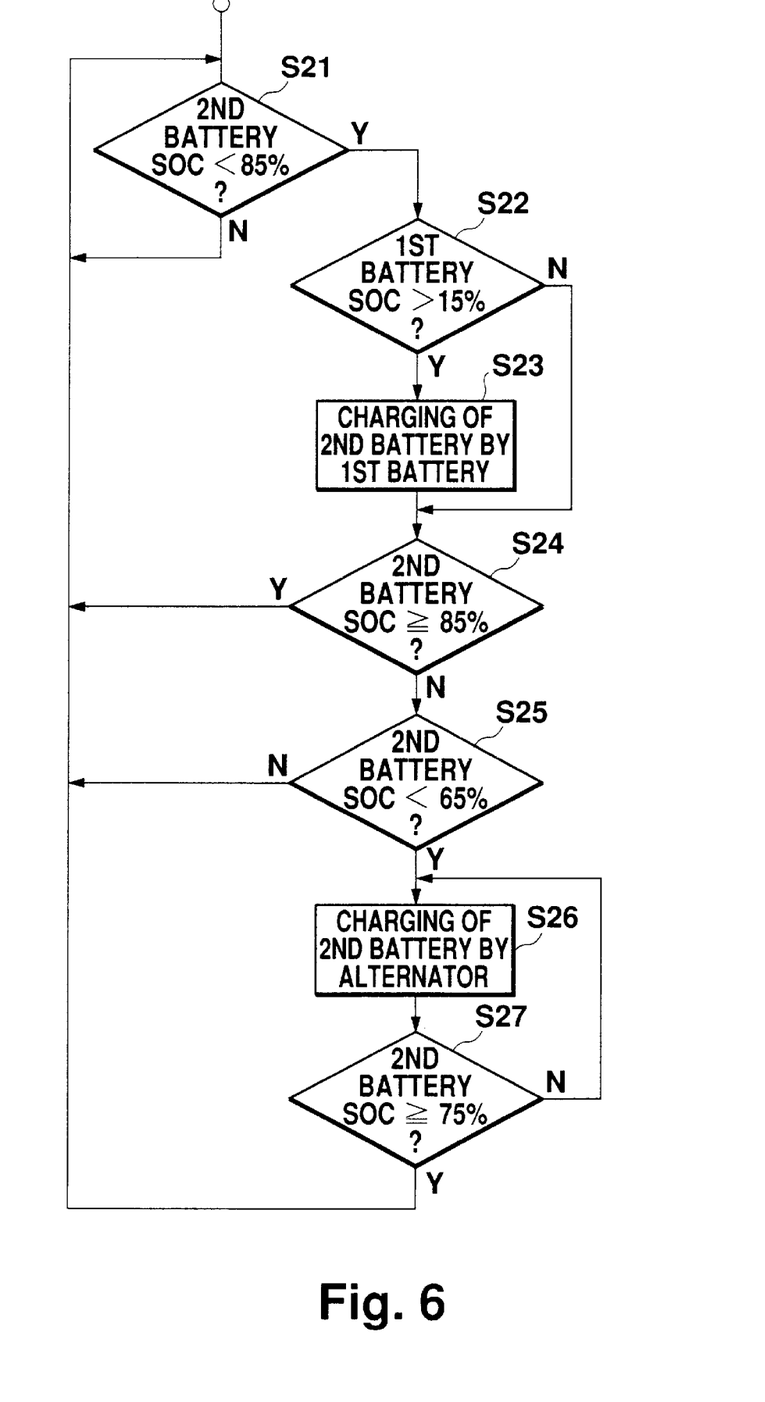
FIG. 6 is a diagram showing a process flow for controlling the SOC of the second battery in FIG. 1.

FIG. 6 shows a control flowchart of the SOC of the second battery 14 in the power supply 10 shown in FIG. 1. According to this embodiment, an example is shown where the control range of the SOC of second battery 14 is 75±10%. In this case, the aforesaid second value is 65% of the SOC of the second battery 14.

In FIG. 6, when the SOC control circuit 18 starts operating, it is determined whether or not the SOC of the second battery 14 is less than 85% (S21). When the SOC of the second battery 14 is 85% or higher, a sufficient value is obtained as output power density as shown in FIG. 3, and power is output to the motor 32.

On the other hand, when the SOC of the second battery 14 is less than 85%, in order to determine whether or not to permit charging from the first battery 12, it is determined whether the SOC of the first battery 12 is larger than 15% (S22). When the SOC of the first battery 12 is larger than 15%, a request to charge the second battery 14 is output from the SOC control circuit 18 to the SOC control circuit 16. Based on this charge request, the SOC control circuit 16 charges the second battery 14 from the first battery 12 via the charging circuit 20 (S23). In this state, it is determined whether or not the SOC of the second battery 14 is 85% or higher (S24).

When the SOC of the second battery 14 is less than 85% in S24, it is determined whether or not the SOC of the second battery 14 is less than 65% (S25). When the SOC of the second battery 14 is 65% or higher in S25, the steps from S21 to S25 are repeated and the second battery 14 is intermittently charged from the first battery 12. Next, when the SOC of the second battery 14 is 85% or higher (S24), the routine returns to S21.

In S22, when the SOC of the first battery 12 is 15% or less, charging of the second battery 14 by the first battery 12 does not take place (S22), and the SOC of the second battery 14 is determined (S24, S25).

When the SOC of the second battery 14 is less than 65% (S25), the second battery 14 is charged by the alternator 24 upon a command issued by the SOC control circuit 18 to maintain a sufficient output power density of the second battery 14 (S26). Charging of the second battery 14 by the alternator 24 continues intermittently in this state until the SOC of the second battery 14 is 75% or higher (S27).

When the SOC of the second battery 14 is 75% or higher, the routine returns to the step S21, and the SOC of the second battery 14 is monitored by the steps S21 to S25.

The power supply 10 shown in FIG. 1 is connected so that the regenerative power from the motor 32 flows not only to the first battery 12 but also to the second battery 14. Hence when the SOC of the second battery 14 exceeds a predetermined upper limit, the SOC control circuit 18 can activate the bypass circuit 26 and earth regenerative power as in the case of the first battery 12 to prevent overcharging of the second battery 14.

Due to the aforesaid steps, the SOC of the second battery 14 is controlled within the range of 75+10%, but the control range is not necessarily limited to this range. It may be set to any range which provides sufficient output power based on the characteristics of the battery used as the second battery 14.

Figure 7:
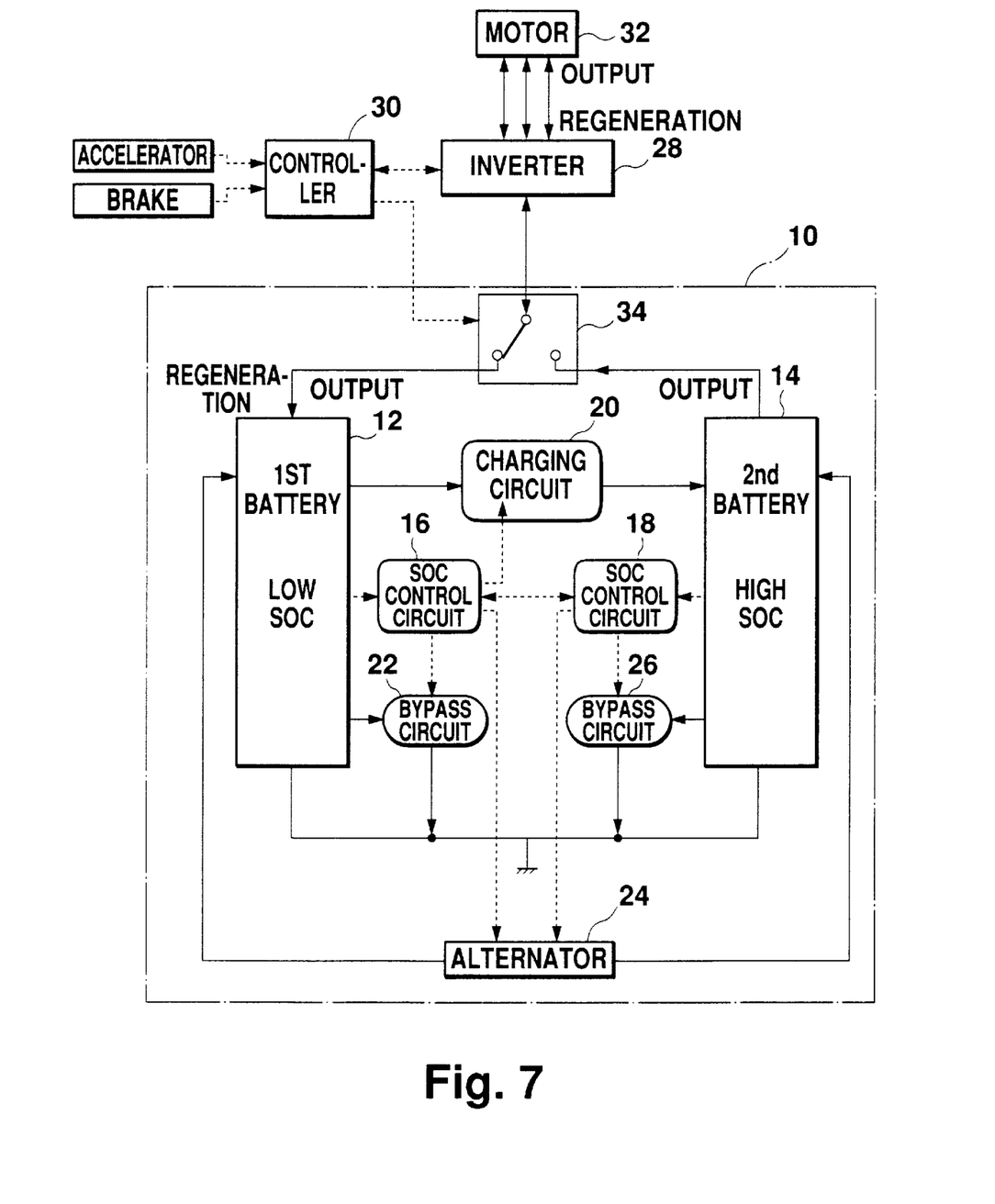
FIG. 7 is a block diagram showing another form of the electric vehicle power supply according to this invention.

FIG. 7 shows a block diagram of another embodiment of the electric vehicle power supply according to this invention. The distinctive feature of FIG. 7 is that a selector switch 34 is provided between the first battery 12 and second battery 14 so that either the battery 12 or the battery 14 is connected to the inverter 28.

According to this embodiment, the battery connected to the inverter 28 is changed over when regenerative power from the motor 32 is stored by the first battery 12, and when power to drive the motor 32 is output by the second battery 14. Therefore when regenerative power is stored, this function is performed by the first battery whose SOC is maintained at a low level and which has a high regenerative power density. When power is output to drive the motor 32, this function is performed by the second battery 14 whose SOC is maintained at a high level, and which has a high output power density. This better exploits the performance characteristics of each battery, and permits greater compactness and lightweightness of the whole device. In particular, when regenerative power is received from the motor 32, the second battery 14 is disconnected from the inverter 28, so overcharging of the second battery 14 is avoided and shortening of the lifetime of the battery is prevented. Moreover, the first battery 12 and second battery 14 are not connected, so unnecessary charging between batteries is also prevented.

The change-over of the selector switch 34 is performed by the controller 30. The selector switch 34 is changed over by signals input from the accelerator, brake, etc., or according to the direction of the current flowing in the inverter. In other words, when the accelerator pedal is depressed, or when the current flowing in the inverter 28 is flowing toward the motor 32, power is being output by the power supply 10, so the controller 30 changes over the selector switch 34 to the second battery 14. On the other hand, when a signal is received from the brake or the current flowing in the inverter 28 is flowing toward the power supply 10, regenerative power is being received, so the controller 30 changes over the selector switch 34 to the first battery 12.

Figure 8:
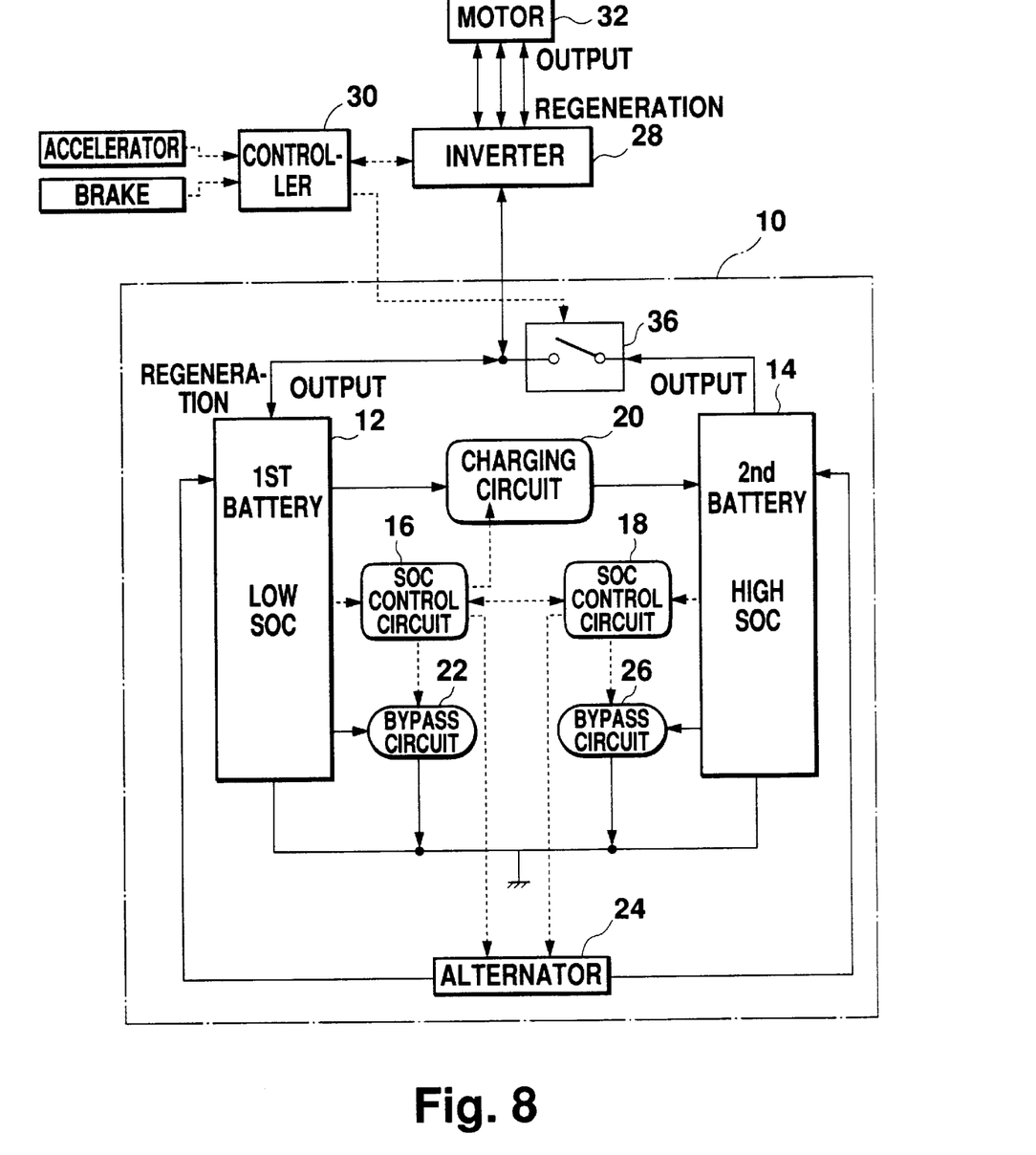
FIG. 8 is a block diagram showing yet another form of the electric vehicle power supply according to this invention.

FIG. 8 shows a block diagram of another embodiment of the electric vehicle power supply according to this invention.

In FIG. 8, a break switch 36 is connected to the second battery 14, and the second battery 14 is disconnected from the circuit except when drive current is flowing from the power supply 10 to the motor 32. According to this construction, when regenerative power flows from the motor 32, the second battery 14 is disconnected. Consequently, overcharging of the second battery 14 due to sudden input of regenerative power is prevented, and shortening of the lifetime of the second battery 14 is prevented.

According to the aforementioned construction, the break switch 36 is operated by the controller 30. As in the case of FIG. 7, opening and closing of the break switch 36 is controlled depending on input signals from the accelerator and brake, and the direction of current flowing in the inverter 28. In other words, when a signal is input from the accelerator pedal or when the current flowing in the inverter 28 is flowing toward the motor 32, the break switch 36 is closed. On the other hand, when a signal is input from the brake to the controller 30 or when the current flowing in the inverter is flowing toward the power supply 10, the break switch 36 is open.

As described above, according to this invention, by maintaining the SOC of the first battery at a low level and the SOC of the second battery at a high level, regeneration of power from the motor is performed mainly by the first battery which has a high regenerative power density, and output of drive power to the motor is performed mainly by the second battery which has a high output power density. Hence the batteries are used while both regenerative power density and output power density are maintained at a high level. Consequently, output power density and regenerative power density are improved, and the power supply can be made more compact and lightweight than in the case where input of regenerative power and output of drive power are performed by a single battery.

Further, as the SOC of the first battery is low and the SOC of the second battery is high, overcharging during regeneration and overdischarging during output are prevented, and the lifetime of the batteries is lengthened.

What is claimed:

1. An electric vehicle power supply wherein a motor is driven by power stored in an electrical storage device, and said electrical storage device is charged by regenerative power from said motor, said power supply comprising:

a first battery contained in said storage device, of which the regenerative power density of said first battery increasing as the SOC (State of Charge) decreases, a second battery contained in said storage device, the output power density of said second battery increasing as the SOC increases, and SOC control means which maintains the SOC of said first battery equal to or lower than a first predetermined value and maintains the SOC of said second battery equal to or higher than a second predetermined value.

2. An electric vehicle power supply as defined in claim 1, wherein said first and second batteries are lithium ion batteries or lithium polymer batteries.

3. An electric vehicle power supply as defined in claim 1, further comprising a selector switch connected to a power circuit of the motor, said selector switch being switched to said first battery when the device is charging with regenerative power and switched to said second battery when the motor is driven.

4. An electric vehicle power supply as defined in claim 1, further comprising a break switch connected to said second battery, said break switch being closed only when drive force is supplied to said motor.

5. An electric vehicle power supply as defined in claim 1, further comprising a circuit for charging said second battery from said first battery.

6. An electric vehicle power supply as defined in claim 1, further comprising a bypass circuit for bypassing said first and second batteries so as to lead regenerative power to earth.

7. An electric vehicle power supply as defined in claim 1, further comprising an alternator for supplying charging current to said first and second batteries when regenerative power is insufficient.

8. An electric vehicle power supply which provides power to drive a motor and which is charged by regenerative power from said motor, said power supply comprising:

first means the regenerative power density of said first means increasing as the SOC (State of Charge) decreases, for being charged by regenerative power, second means the output power density of said second means increasing as the SOC increases, for supplying power to drive said motor, and third means for maintaining the SOC of said first means equal to or lower than a first predetermined value and maintaining the SOC of said second means equal to or higher than a second predetermined value.

\* \* \* \* \*